United States Patent [19]
Rosenburg et al.

[11] Patent Number: 5,910,801
[45] Date of Patent: Jun. 8, 1999

[54] MECHANISM FOR FINE-GRAINED AND COARSE-GRAINED CONTROL OF ZOOMING IN A DISPLAY OF A ONE-DIMENSIONAL DATA SET

[75] Inventors: Bryan Savoye Rosenburg, Cortlandt Manor; Tova Roth, Far Rockaway, both of N.Y.; Michael Hadley Skelton, Austin; James Hoyet Summers, Round Rock, both of Tex.

[73] Assignee: International Business Machines Corporation, Armonk, N.Y.

[21] Appl. No.: 08/924,062

[22] Filed: Aug. 28, 1997

Related U.S. Application Data

[63] Continuation of application No. 08/502,520, Jul. 14, 1995, Pat. No. 5,790,819.

[51] Int. Cl.$^6$ .................................................. G06F 15/00
[52] U.S. Cl. .......................................... 345/339; 345/326
[58] Field of Search ...................... 345/339, 341, 345/391, 326, 327–338, 101–117, 357

[56] References Cited

PUBLICATIONS

M. Mills, et al., "A Magnifier Tool for Video Data", ACM Conf. on Human Factors in Computing Systems, May 3–Jul. 92, pp. 93–98.

T. Lehr "Piescope User's Guide", Feb. 17, 1993, pp. 1–22.

*Primary Examiner*—Steven P. Sax
*Attorney, Agent, or Firm*—Jay P. Sbrollini

[57] ABSTRACT

A zoom control mechanism includes a context display for displaying a representation of a data set, a zoom display for displaying a representation of a zoom interval within the data set, a context indicator that indicates a start point or an end point of a zoom interval within a context display, and a zoom indicator, corresponding to the context indicator, that indicates the start point or end point of the zoom interval within the zoom display. The zoom interval is updated according to user selection and movement of the context indicator and the zoom indicator to a new location within the context display and the zoom display, respectively.

8 Claims, 10 Drawing Sheets

MECHANISM FOR FINE-GRAINED AND COARSE-GRAINED CONTROL OF ZOOMING IN A DISPLAY OF A ONE-DIMENSIONAL DATA SET

This is a continuation of application Ser. No. 08/502,520, filed Jul. 14, 1995, now U.S. Pat. No. 5,790,819.

BACKGROUND OF THE INVENTION

1. Technical Field

This invention relates to the field of computer graphical interfaces. More specifically, the invention relates to using graphical interfaces to display and analyze one-dimensional data sets.

2. Description of the Related Art

The term one-dimensional data set is used to refer to a data set that has an inherent distinguished, or principle, coordinate axis. Examples include data sets consisting of the values of one or more time-varying functions at each of a number of different times, and data sets consisting of the values of one or more address-varying functions at different points in a linear address space. In the former, the distinguished coordinate axis is the time axis, while in the latter, the address axis is the principle axis.

A subinterval of a one-dimensional data set consists of those data values from the original set that, with respect to the principle data set axis, fall between a start point and an end point selected on the principle axis.

One-dimensional data sets are typically displayed graphically with the principle axis laid out either horizontally or vertically in a display area, and with the data values at different points along the principle axis indicated using color, line displacement, or any of a number of other techniques. The particular technique used to indicate the data values at different points along the principle axis is not relevant to this invention.

A one-dimensional data set may be so large that it is not possible to display all of it in full detail in the available display area. The term zooming is used to refer to the process of selecting a subinterval of the data set and displaying the data values in that subinterval in greater detail. The zoom interval is the subinterval of the data set selected during zooming. The zoom display is the display area used to show the data values in the zoom interval.

The term context display is used to refer to a display area that shows a representation of the entire one-dimensional data set. A context display shows a "high-altitude" view of the data set. The high-level structure of the data set may be apparent, but details may not be visible.

A context indicator is a visual artifact placed in or adjacent to a context display that marks either the start point or the end point (along the principle axis of the data set) of the zoom interval that is displayed in an accompanying zoom display. A context start indicator marks the start point of the zoom interval while a context end indicator marks the end point. Examples of context indicators include arrow heads or line endpoints placed adjacent to the context display, cursor lines drawn through the context display perpendicular to the principle axis, and edges of a highlighted region in the context display.

A zoom indicator is a visual artifact placed in or adjacent to a zoom display that marks either the start point or the end point (along the portion of the principle data set axis shown in the zoom display) of the displayed zoom interval. A zoom start indicator marks the start point of the zoom interval while a zoom end indicator marks the end point. Zoom indicators are typically paired with context indicators, and may be visually connected to make the correspondence apparent. Zoom indicators are typically placed at the extreme edges of the zoom display, but that is not a requirement. The zoom display may show some context for the zoom interval, in which case the zoom indicators will be inset somewhat from the edges of the zoom display.

A context midpoint indicator is a visual artifact that marks (in a context display) the midpoint of a displayed zoom interval. A zoom midpoint indicator marks the same midpoint in a zoom display.

In most systems for displaying one-dimensional data sets, the context display, if one is provided at all, takes the form of a simple time line or other scale. Such a display provides almost no real context for the zoom display, but at least it provides a place to put context indicators that indicate the extent of the zoom interval. Furthermore, the system may allow the user to change the start and end points of the zoom interval by directly manipulating the context indicators with a pointing device. This capability gives the user control over both the size and location of the zoom interval, but the control is coarse-grained because the end points of the zoom interval are selected with respect to the lower-resolution context display rather than to the higher-resolution zoom display.

In some systems for displaying one-dimensional data sets, the user can refine the zoom interval by pointing at new start and end points in the zoom display itself. This capability gives the user fine-grained control over the zoom interval because the new end points are selected with respect to the higher-resolution zoom display, but it does not let the user increase the size of the zoom interval or move it to a new location within the data set.

The Hierarchical Video Magnifier described by Mills et al. in "A Magnifier Tool for Video Data" in CHI'92 is an example of a system for displaying one-dimensional data sets that provides a context display, a zoom display, and context and zoom indicators. The system actually provides multiple levels of context and zoom displays, a zoom display at one level serving as the context display for the next deeper level. The "data sets" displayed by this system are video streams. The principle coordinate axis is the time axis, and the "data values" are video frames evenly spaced along the time axis. In the Hierarchical Video Magnifier, a context display is a horizontal time line annotated with miniature representations of video frames selected from the full set of frames in the data set. Context start and end indicators are the left and right edges, respectively, of a rectangle called a "magnifier" superimposed on the context display. The zoom display is a second annotated, horizontal time line placed some distance beneath the context display. The zoom start and end indicators are vertical line segments placed at the left and right edges of, and immediately above, the zoom display. The context and zoom start indicators are connected by a line segment to show their correspondence. The context and zoom end indicators are similarly connected. The space between the context and zoom displays is also used to show enlarged versions of the miniature video frames used to annotate the zoom display.

In the Hierarchical Video Magnifier, the user can change the displayed zoom interval by changing the width and/or the position of the magnifier rectangle in the context display with a mouse.

Piescope, as described by Ted Lehr in "Piescope User's Guide", is an example of a system for displaying one-dimensional data sets that has a zooming capability, but does not provide a context display at all. In this system the principle axis is again the time axis. A number of horizontal colored strips are used to convey information about the state of a computer system, as that information evolves over time.

In Piescope, the entire display area is devoted to the zoom display. There is no context display and there are no context indicators. The initial zoom interval is the time range covered by the entire data set, so that to begin with a representation of the entire data set is displayed. A new, smaller zoom interval is selected by first positioning (with a pointing device) a vertical cursor line somewhere in the zoom display. This cursor serves as a zoom start indicator. A second cursor (a zoom end indicator) is then positioned somewhere to the right of the start indicator in the zoom display. Once the end indicator is positioned, the zoom interval is changed to the subinterval delimited by the pair of indicators, and the zoom display is redrawn to show just the zoom interval.

In Piescope, a simple action with the pointing device is used to expand the zoom interval. This action increases the width of the zoom interval by a constant factor of 5, keeping the position of the center of the interval unchanged as much as possible.

Systems for displaying two-dimensional data sets also commonly provide a zooming capability, and two-dimensional analogs of most of the system elements described here exist. Instead of a principle data-set coordinate axis there is a principle coordinate plane, which is mapped to a rectangular display area. A context display is a high-level view of the entire data set. Instead of a zoom interval, there is a zoom rectangle, whose data values are displayed in a zoom display. An outlined or highlighted rectangle in the context display, showing the extent of the zoom rectangle, takes the place of context start and end indicators.

A variety of mechanisms by which the user can change the zoom rectangle exist. Arrow buttons or scroll bars let the user shift the position of the zoom rectangle within the full data set without changing its size. Buttons or menus let the user change the size of the zoom rectangle (thereby changing the scale of the zoom display), either by fixed factors or to arbitrary values. Some systems let the user mark out, with a pointing device, a new zoom rectangle in the zoom display, at which point the zoom display is redrawn to show the new zoom rectangle.

Finally, some systems that provide a context display let the user directly manipulate the highlighted context display rectangle that indicates the extent of the zoom rectangle, changing its size and/or location.

However, no single system for displaying either one-dimensional or two-dimensional data sets provides a uniform and intuitive zooming interface that allows both coarse-grained manipulation of the zoom interval or rectangle in a context display and fine-grained refinement of the zoom interval or rectangle in the zoom display. Most systems do not provide a context display at all, only a zoom display. Such systems can provide intuitive interfaces for refining the zoom interval or rectangle, but mechanisms for expanding the zoom interval or rectangle, or moving it to another location in the data set, are ad hoc and/or non-intuitive. Systems that provide a context display can provide intuitive interfaces for manipulating the zoom interval or rectangle directly in the context display, providing coarse-grained control of the size and location of the zoom interval or rectangle. Such systems can also allow fine-grained manipulation of the zoom interval or rectangle in the zoom display. However, in all existing systems, the interfaces for coarse-grained and fine-grained control of the zoom interval or rectangle are different. Importantly, no system provides a single, intuitive interface that allows both coarse-grained and fine-grained control.

SUMMARY OF THE INVENTION

The above-stated problems and related problems of the related art are solved with the principles of the present invention, mechanism for fine-grained and coarse-grained control of zooming in a display of a one-dimensional data set. The zoom control mechanism of the present invention includes at least a context indicator that indicates either a start point and an end point of a zoom interval within a context display, and a zoom indicator that indicates the start point or the end point of the zoom interval within a zoom display. The zoom interval is updated according to user selection and movement of the context indicator and the zoom indicator to a new location within the context display or the zoom display, respectively.

Advantageously, the zooming mechanism of the present invention provides for a uniform, intuitive, and user-friendly interface that allows both coarse-grained manipulation of the zoom interval in a context display and fine-grained refinement of the zoom interval in the zoom display.

BRIEF DESCRIPTION OF THE DRAWINGS

FIG. 2(A) shows context and zoom end indicators.

DETAILED DESCRIPTION OF THE PREFERRED EMBODIMENTS

Figure 1:
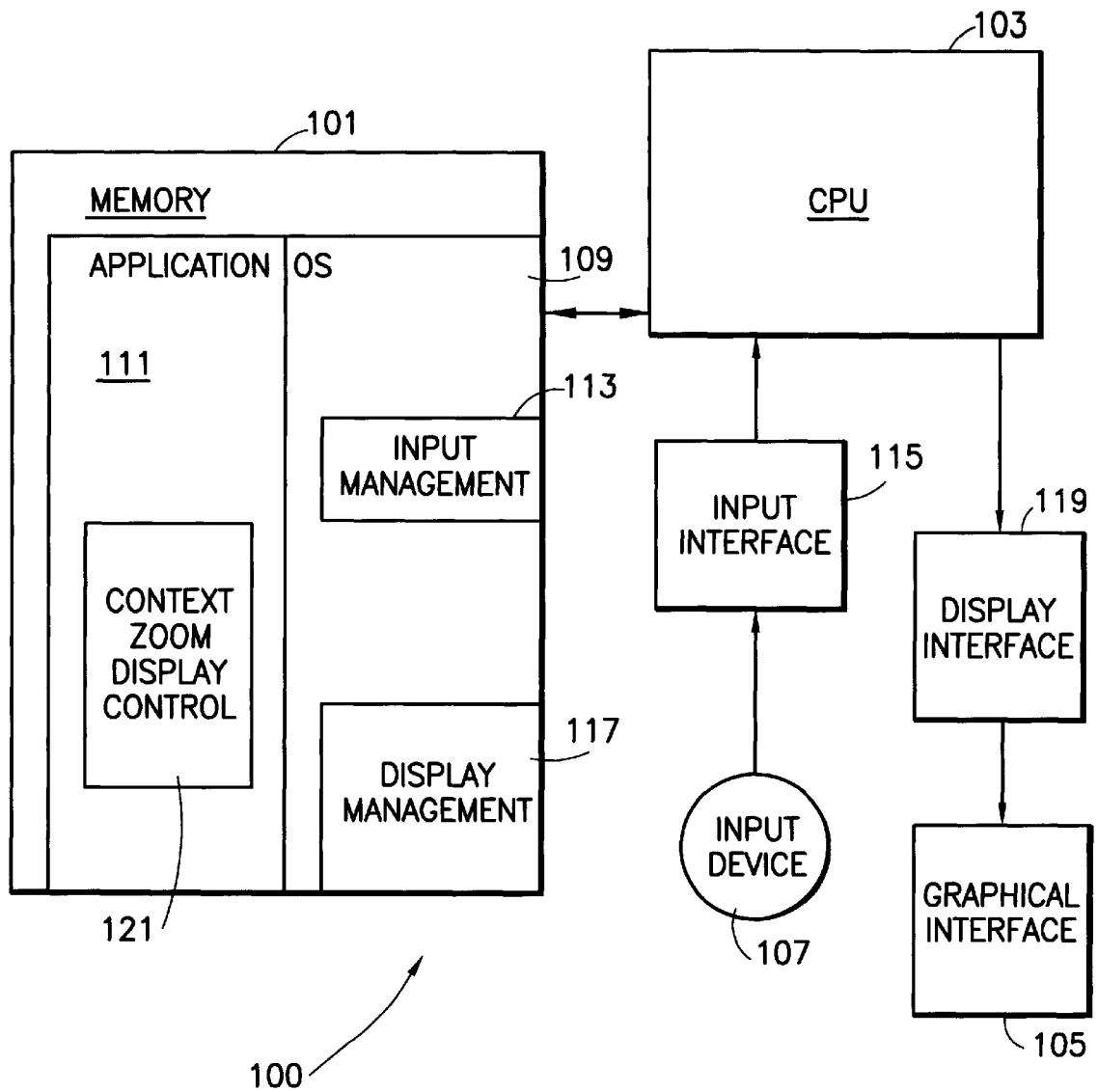
FIG. 1 is a block diagram of a computer processing system that embodies the present invention.

FIG. 1 is a functional block diagram of a general purpose computer system 100 that embodies the present invention.

The computer system 100 includes memory 101, at least one central processing unit (CPU) 103 (one shown), a graphical interface 105 such as a CRT display or LCD display, and at least one user input device 107 such as, for example, a keyboard, mouse, voice recognition system, handwriting recognition system. The memory 101 stores an operating system 109 and an application program that are executed by the CPU 103. The operating system 109 includes an input management routine 113 that controls the CPU 103 to periodically fetch user input commands from the input device 107 typically via an input interface 115. Upon receipt, the user input commands received by the input management routine may be communicated to the application program 111, if applicable. Moreover, the operating system includes a display management routine 117 that periodically controls the CPU 103 to update the data displayed by the graphical interface 105 via a display interface 119. The application program 111 may control the update of the data displayed by the graphical interface 105 by issuing display update commands to the display management routine 117 of the operating system 109.

According to the present invention, the application program 111 includes a context and zoom display control routine 121 that provides a uniform and intuitive zooming interface that allows both coarse-grained manipulation of the zoom interval in a context display and fine-grained refinement of the zoom interval in the zoom display.

Figure 2:
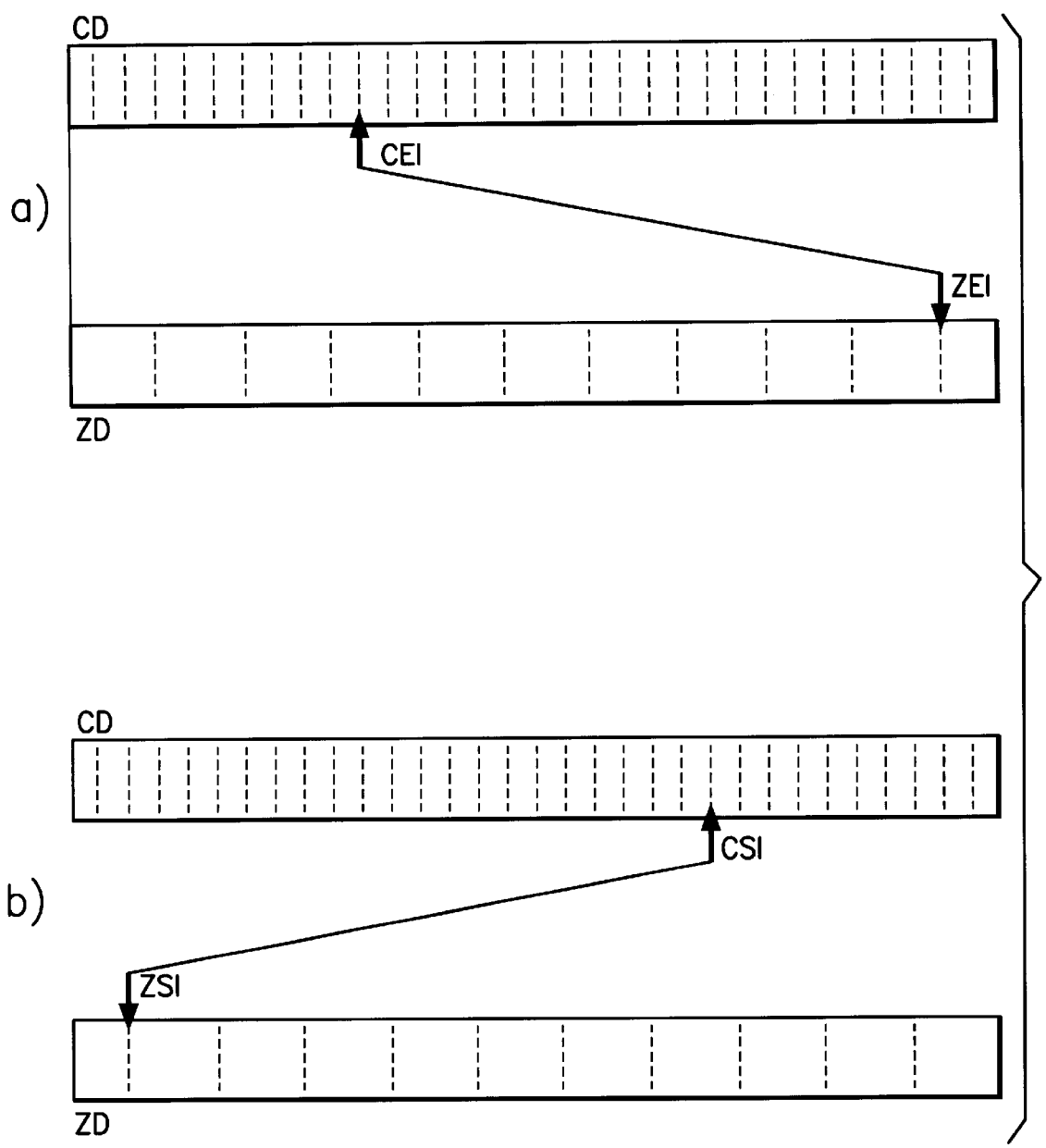
FIGS. 2(A) and (B) illustrate a context and a zoom display according to the present invention.
FIG. 2(B) shows context and zoom start indicators.

FIG. 2 illustrates the main graphical elements of the invention, as they might appear on a display area of the graphical interface 105 of the computer system 100. Generally, in FIGS. 2(A) and (B), the rectangle CD is the context display wherein the representation of the entire one-dimensional data set is displayed. The exact nature of the representation, and the manner in which the data set is abstracted or reduced so that it can be represented in the available area, are not relevant to this invention. Moreover, the principle coordinate axis of the data set is shown as being laid out horizontally for illustrative purposes only, thus other orientations are not precluded. The rectangle ZD is the zoom display wherein the representation of a selected subinterval (the zoom interval) of the one-dimensional data set is displayed. Again, the exact nature of the representation is not relevant to this invention. The dashed vertical lines shown in the context display CD and zoom display ZD are intended merely to indicate the relative scales of the displayed data representations.

More specifically, FIG. 2(A) includes a context end indicator CEI and corresponding zoom end indicator ZEI for the zoom interval, but does not include context and zoom start indicators. In this case, the start of the zoom interval is assumed to be fixed. For example, the start of the zoom interval may be fixed to the start of the one-dimensional data set as shown. On the other hand, FIG. 2(B) includes a context start indicator CSI and corresponding zoom start indicator ZSI for the zoom interval, but does not include end indicators. In this case, the end of the zoom interval is assumed to be fixed. For example, the end of the zoom interval may be fixed to the end of the one-dimensional data set as shown.

In FIG. 2(A), the short, vertical, upward-pointing arrow CEI is the context end indicator that marks, in the context display, the end of the displayed zoom interval. As shown, the context end indicator is shown as an arrow, but it could be any visual artifact that marks a particular point along the principle coordinate axis in the context display. Other possibilities include, but are not limited to, a cursor line drawn through the context display perpendicular to the principle axis or the edge of an outlined or highlighted region of the context display. In FIG. 2(A), the short, vertical, downward-pointing arrow ZEI is the zoom end indicator that marks, in the zoom display, the end of the zoom interval. The zoom end indicator may appear at the very end of the zoom display, or it may be inset somewhat, as in FIG. 2(A), to allow the zoom display to show some amount of context for the zoom interval. As with the context end indicator, the zoom indicator is shown as an arrow in the figure, but some other visual artifact can be used instead.

In FIG. 2(B), the arrows CSI and ZSI are the context and zoom start indicators, respectively. They mark the start of the zoom interval in, respectively, the context and zoom displays. As with the context and zoom end indicators of FIG. 2(A), the context and zoom start indicators CSI and ZSI of FIG. 2(B) are shown as arrows, but other visual artifacts can be used instead.

In FIGS. 2(A) and (B), the context and zoom end indicators CEI and ZEI as well as the context and zoom start indicators CSI and ZSI are shown connected by a thin, diagonal line segment to show their relationship. This explicit indication of the relationship is optional.

Figure 3:
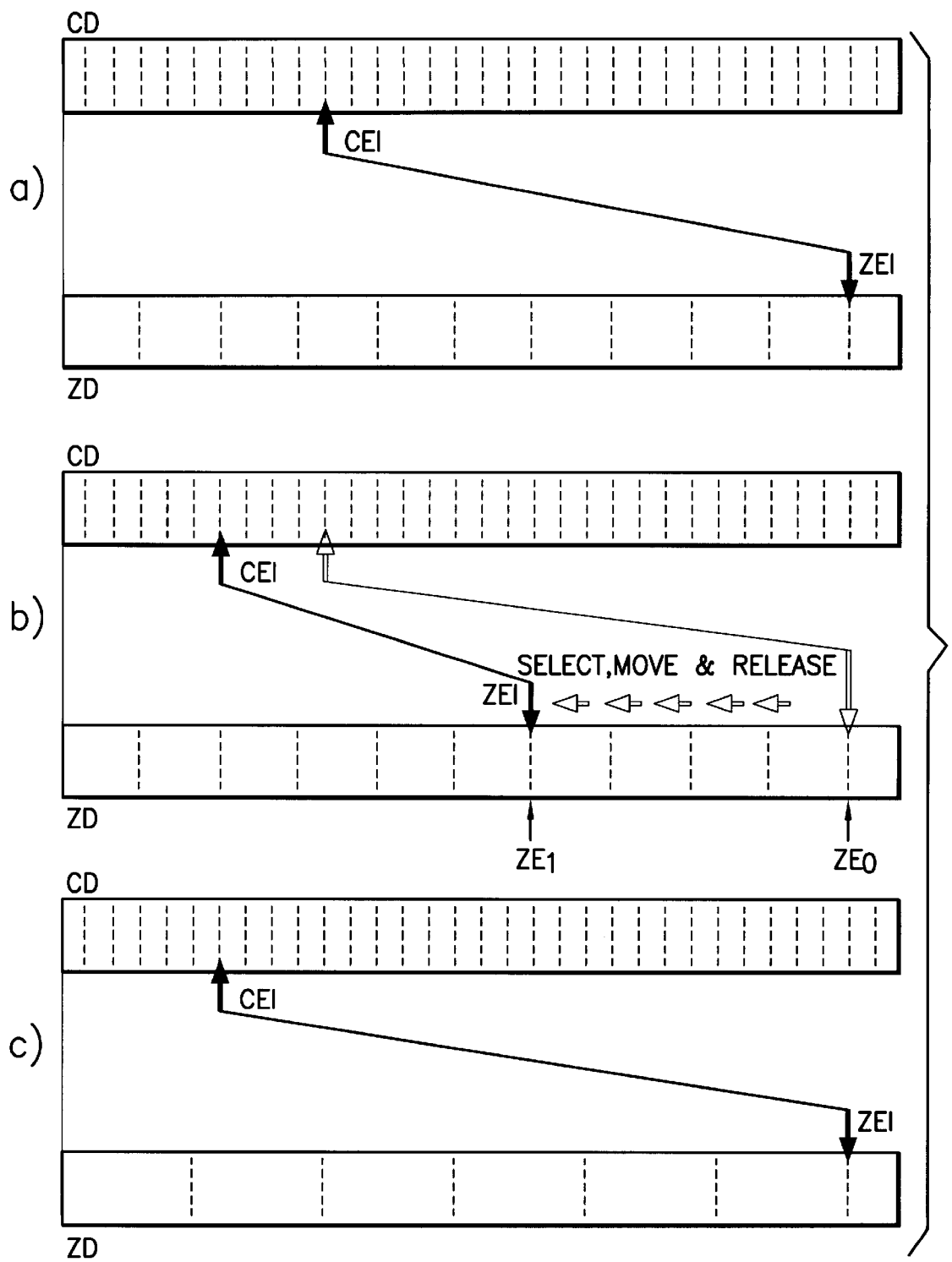
FIGS. 3(A)–(C) illustrate the action of the user in controlling the zoom interval by moving the zoom end indicator, and the resulting update to the context and zoom displays according to the present invention.
Figure 4:
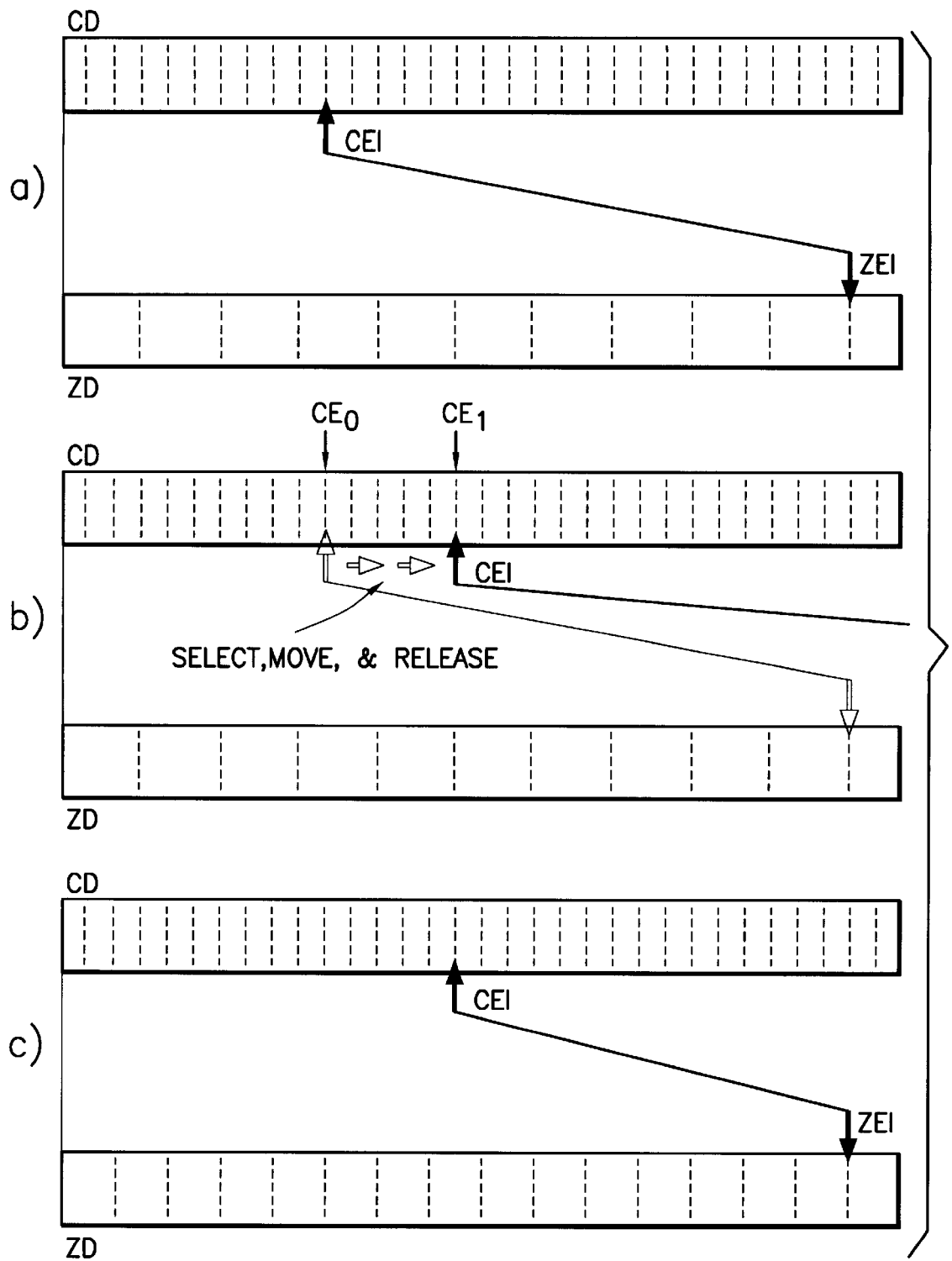
FIGS. 4(A)–(C) illustrate the action of the user in controlling the zoom interval by moving the context end indicator, and the resulting update to the context and zoom displays according to the present invention.

FIGS. 3 and 4 illustrate the user-controlled movement of the context and zoom end indicators CEI and ZEI in a system such as that shown in FIG. 2(A). In a system having context and zoom start indicators CSI and ZSI, such as that shown in FIG. 2(B), the user-controlled movement of the context and zoom start indicators may be handled in a similar fashion. More specifically, FIG. 3 illustrates the action of selecting the zoom end indicator, moving it to a new location in the zoom display, and releasing it, effectively zooming further into the one-dimensional data set. FIG. 3(A) shows the display before the action is initiated. FIG. 3(B) shows the display while the action is in progress. FIG. 3(C) shows the display after the action has completed and the zoom display has been updated. The ability to move the zoom end indicator provides a fine level of control over the end point of the zoom interval, although it only allows the end point to be moved to a position inside the currently displayed zoom interval, effectively shrinking the interval.

FIG. 3(A) shows the initial state of the context and zoom display with a particular zoom interval selected and displayed. As in FIG. 2(A), the start of the zoom interval is assumed to be fixed at the start of the data set, while the end of the zoom interval is marked by context and zoom end indicators CEI and ZEI. FIG. 3(B) illustrates the user-controlled action of selecting the zoom end indicator and moving it from its initial location $ZE_0$ to a new location $ZE_1$ in the zoom display. The series of horizontal arrow heads labeled "select, move & release" is intended to represent the movement of the zoom end indicator ZEI to its new location. The mechanism by which the user selects and moves the indicator may be by pointing device, cursor keys, or other user input commands. As the zoom end indicator ZEI is moved, the corresponding context end indicator CEI moves as well, to a new location in the context display. For illustrative purposes only, the initial locations of the context and zoom end indicators CEI and ZEI are marked with grey "ghosts" of the indicators. As a result of the user input, the context end indicator CEI moves a physically smaller distance than the zoom end indicator ZEI because the scales in the context and zoom displays are different. This sympathetic motion of an indicator when the user selects and move its corresponding indicator is an optional feature of the invention. FIG. 3(C) shows the state of the display after the zoom end indicator ZEI has been released. The zoom display has been redrawn to display the new (smaller) zoom interval, and the context and zoom end indicators CEI and ZEI have been repositioned to show the new relationship of the zoom display to the context display.

FIG. 4 illustrates the action of selecting the context end indicator CEI, moving it to a new location in the context display, and releasing it, effectively zooming out of the one-dimensional data set. The same operations can also be used to zoom into the one-dimensional data set. FIG. 4(A) shows the context and zoom displays before the action is initiated. FIG. 4(B) shows the context and zoom displays while the action is in progress, and FIG. 4(C) shows the display after the action has completed and the zoom display has been updated. The ability to move the context end indicator CEI allows the user to either expand or shrink the zoom interval, that is, zoom either in or out, because the context end indicator can be moved to any location in the context display. However, moving the context end indicator CEI provides only a coarse level of control over the end point of the zoom interval, because of the scale of the context display.

FIG. 4(A) is identical to FIG. 2(A) and shows the initial state of the context and zoom displays with a particular zoom interval selected and displayed. As in FIG. 2(A), the start of the zoom interval is assumed to be fixed at the start of the data set, while the end of the zoom interval is marked by context and zoom end indicators CEI and ZEI. FIG. 4(B) illustrates the user-controlled action of selecting the context end indicator CEI and moving it from its initial location $CE_0$ to a new location $CE_1$ in the context display. The series of horizontal arrow heads labeled "select, move & release" is intended to represent the movement of the context end indicator CEI to its new location. As the context end indicator CEI is moved, the corresponding zoom end indicator ZEI moves as well. For illustrative purposes only, the initial locations of the context and zoom end indicators CEI and ZEI are marked with grey "ghosts" of the indicators. In the example shown in FIG. 4(B), the context end indicator CEI has been moved to a point outside the currently displayed zoom interval, so the corresponding zoom end indicator ZEI has logically moved off the zoom display and is not shown. The optional line that normally connects the context and zoom indicators remains, suggesting the location of the off-display zoom indicator. FIG. 4(C) shows the state of the context and zoom displays after the context end indicator CEI has been released, wherein the zoom display has been redrawn to display the new (larger) zoom interval, and the context and zoom end indicators CEI and ZEI have been repositioned to show the new relationship of the zoom display to the context display.

Figure 5:
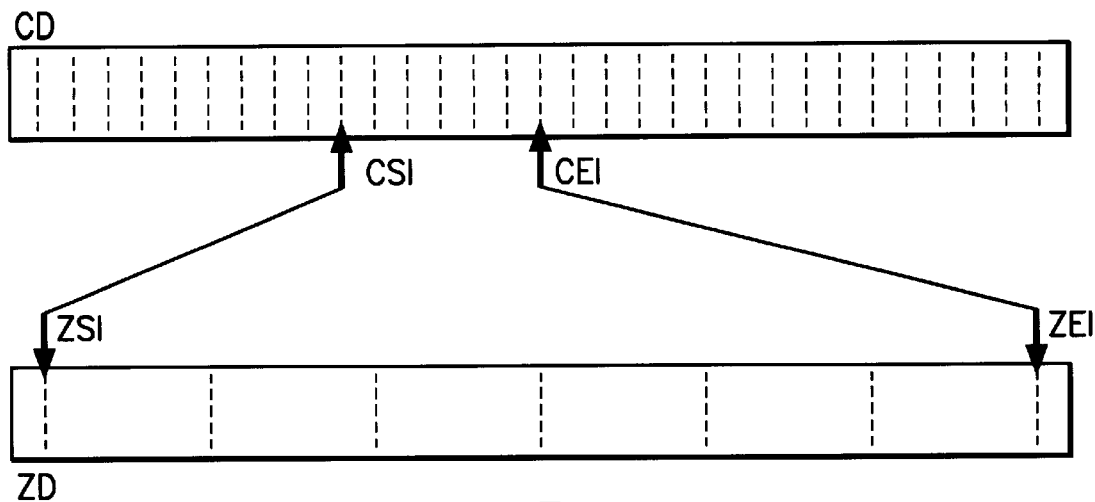
FIG. 5 illustrates a system that has both start and end zoom indicators and corresponding start and end context indicators.

FIG. 5 shows a system whose context display CD includes both context start and end indicators CSI and CEI and whose zoom display ZD includes both zoom start and end indicators ZSI and ZEI for the zoom interval. The start indicators CSI and ZSI as well as the end indicators CEI and ZEI are shown connected by a thin, diagonal line. The connecting lines are optional. Any of the four indicators can be selected and moved by the user in the manner illustrated in FIGS. 3(A)–(C) and 4(A)–(C), but only one can be moved at a time. While one of the start indicators CSI or ZSI is being moved, the end of the zoom interval is regarded as fixed, and while one of the end indicators CEI or ZEI is being moved, the start of the zoom interval is regarded as fixed.

Figure 6:
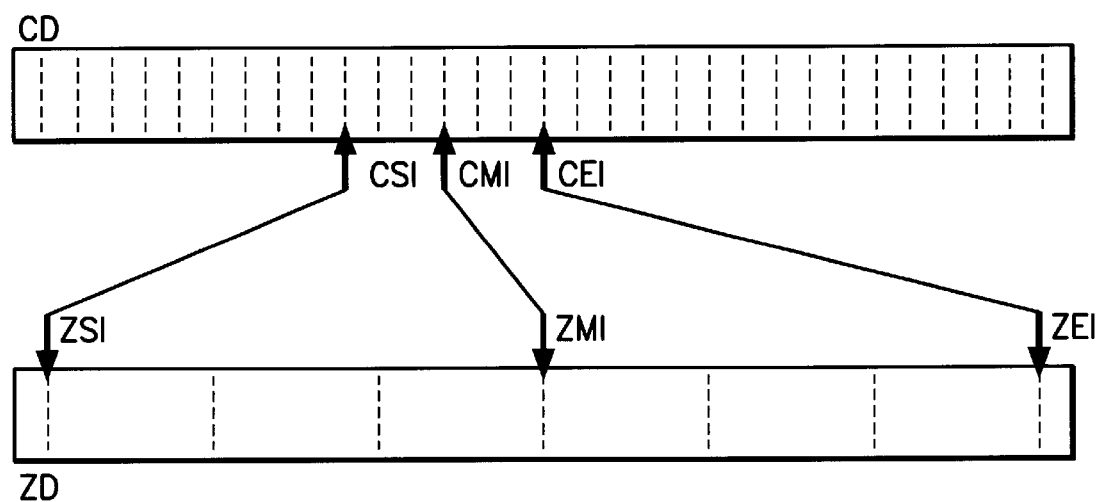
FIG. 6 illustrates a system that has a zoom midpoint indicator and corresponding context midpoint indicator.
Figure 7:
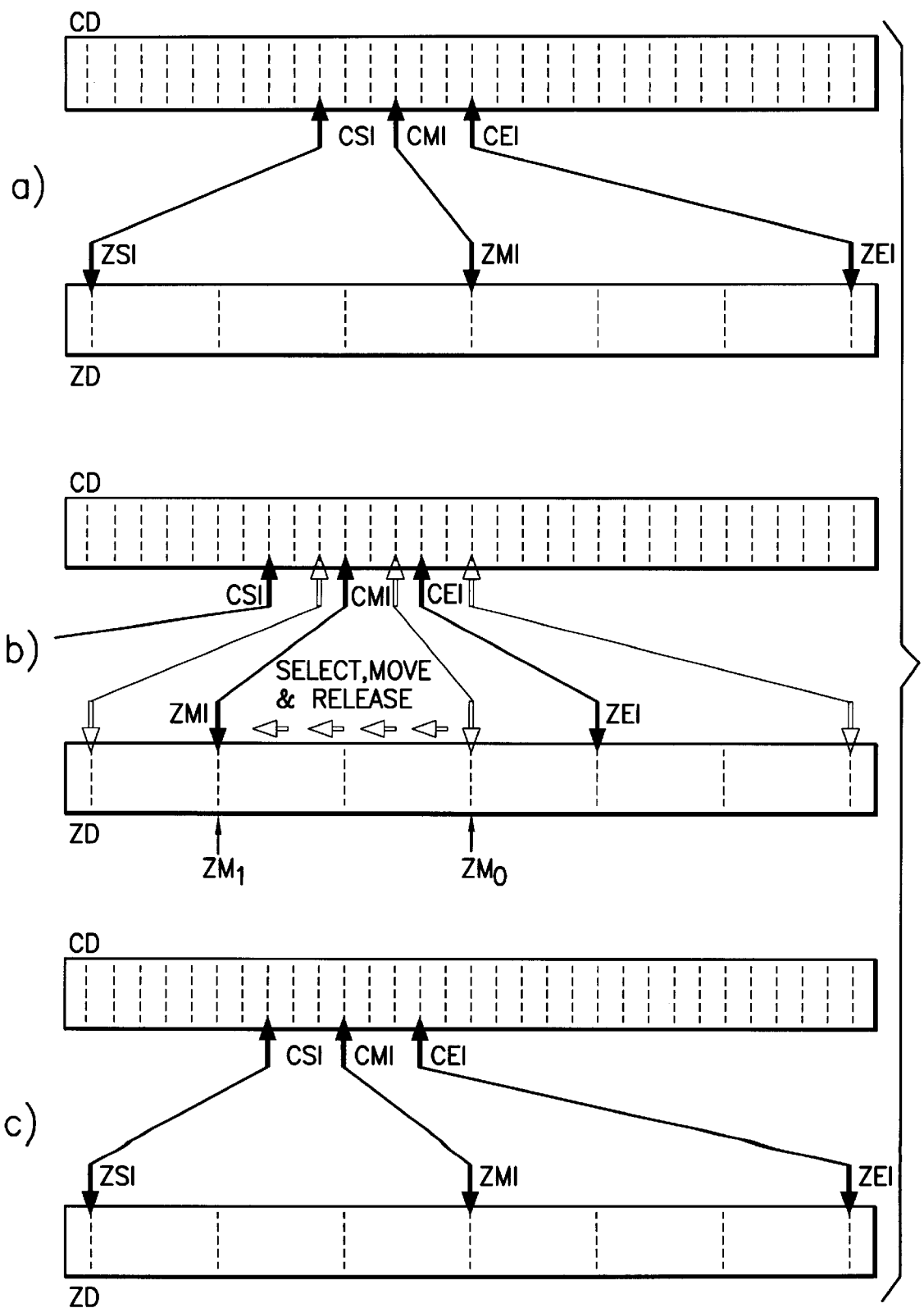
FIG. 7(A)–(C) illustrate the action of the user in controlling the zoom interval by moving the zoom midpoint indicator, and the resulting update to the context and zoom displays according to the present invention.
Figure 8:
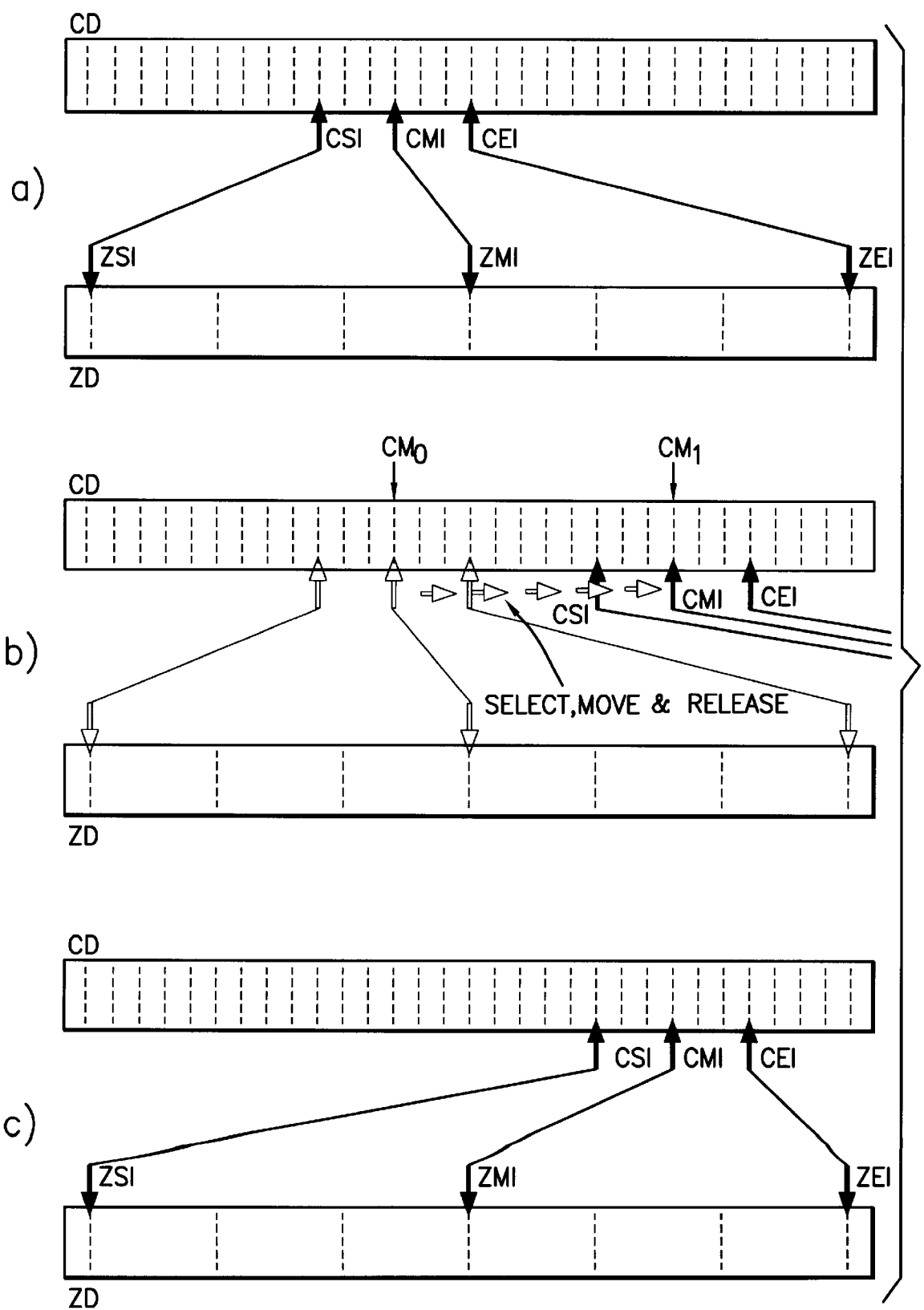
FIG. 8(A)–(C) illustrate the action of the user in controlling the zoom interval by moving the context midpoint indicator, and the resulting update to the context and zoom displays according to the present invention.

FIG. 6 shows a system that, in addition to the elements shown in FIG. 5, includes a context midpoint indicator CMI and a zoom midpoint indicator ZMI for the zoom interval. The midpoint indicators CMI and ZMI are shown as short, vertical arrows, but other visual artifacts can be used instead. The midpoint indicators CMI and ZMI are also shown connected by a thin line, which is optional.

FIGS. 7(A)–(C) and 8(A)–(C) illustrate the user-controlled movement of the context and zoom midpoint indicators CMI and ZMI of FIG. 6. By moving one of the midpoint indicators CMI and ZMI, the user can change the position of the zoom interval within the full data set without changing its size.

More specifically, FIGS. 7(A)–(C) illustrate the action of selecting the zoom midpoint indicator ZMI, moving it to a new location in the zoom display, and releasing it. FIG. 7(A) shows the context display CD and zoom display ZD before the action is initiated. FIG. 7(B) shows the context display CD and zoom display ZD while the action is in progress. FIG. 7(C) shows the context display CD and zoom display ZD after the action has completed and the zoom display ZD has been updated. The ability to move the zoom midpoint indicator ZMI provides a fine level of control over the position of the zoom interval, although it only allows the interval to be moved a small distance; that is, to a new position that overlaps the current position. FIG. 7(A) is identical to FIG. 6 and shows the initial state of the context display CD and zoom display ZD with a particular zoom interval selected and displayed. FIG. 7(B) illustrates the user-controlled action of selecting the zoom midpoint indicator (ZMI) and moving it from its initial location $ZM_0$ to a new location $ZM_1$ in the zoom display. The series of horizontal arrow heads labeled "select, move & release" is intended to represent the movement of the zoom midpoint indicator ZMI to its new location. As the zoom midpoint indicator ZMI is moved, the zoom start and end indicators ZSI and ZEI move as well, maintaining their spacing. One or the other of these indicators may disappear off the edge of the zoom display ZD, depending on how far and in which direction the zoom midpoint indicator ZMI is moved. For example, as shown in FIG. 7(B), the zoom start indicator ZSI has disappeared off the left edge of the zoom display ZD. As the zoom indicators ZSI, ZMI, and ZEI move, the corresponding context indicators CSI, CMI, and CEI may move as well. For illustrative purposes only, the initial locations of the context indicators CSI, CMI and CEI, and the zoom indicators ZSI, ZMI and ZEI are marked with grey "ghosts" of the indicators. FIG. 7(C) shows the state of the context display CD and zoom display ZD after the zoom midpoint indicator ZMI has been released, wherein the zoom display ZD has been redrawn to display the new (shifted) zoom interval, and all the indicators have been repositioned to show the new relationship of the zoom display ZD to the context display CD.

FIGS. 8(A)–(C) illustrate the action of selecting the context midpoint indicator CMI, moving it to a new location in the context display CD, and releasing it. FIG. 8(A) shows the context display CD and zoom display ZD before the action is initiated. FIG. 8(B) shows the context display CD and zoom display ZD while the action is in progress. FIG. 8(C) shows the context display CD and zoom display ZD after the action has completed and the zoom display ZD has been updated. The ability to move the context midpoint indicator CMI lets the user move the zoom interval directly to any position in the data set, although it provides only a coarse level of control over the position because of the scale of the context display.

More specifically, FIG. 8(A) is identical to FIG. 6 and shows the initial state of the context display CD and zoom display ZD with a particular zoom interval selected and displayed. FIG. 8(B) illustrates the user-controlled action of selecting the context midpoint indicator CMI and moving it from its initial location $CM_0$ to a new location $CM_1$ in the context display CD. The series of horizontal arrow heads labeled "select, move & release" is intended to represent the movement of the context midpoint indicator to its new location. As the context midpoint indicator CMI is moved, the context start and end indicators CSI and CEI move as well, maintaining their spacing. As the context indicators CSI, CMI, and CEI move, the corresponding zoom indicators ZSI, ZMI, and ZEI may also move. For illustrative purposes only, the initial locations of the context indicators CSI, CMI, and CEI, and the zoom indicators ZSI, ZMI, and ZEI are marked with grey "ghosts" of the indicators. One or more of the zoom indicators may disappear off the edge of the zoom display ZD, depending on how far and in which direction the context midpoint indicator CMI is moved. For example, in FIG. 8(B), the zoom interval has been moved entirely outside its initial location, so all three zoom indicators ZSI, ZMI, ZEI have disappeared off the right edge of the zoom display ZD. FIG. 8(C) shows the state of the context display CD and zoom display ZD after the context midpoint indicator CMI has been released. The zoom display ZD has been redrawn to display the new (shifted) zoom interval, and all the indicators have been repositioned to show the new relationship of the zoom display ZD to the context display CD.

Figure 9:
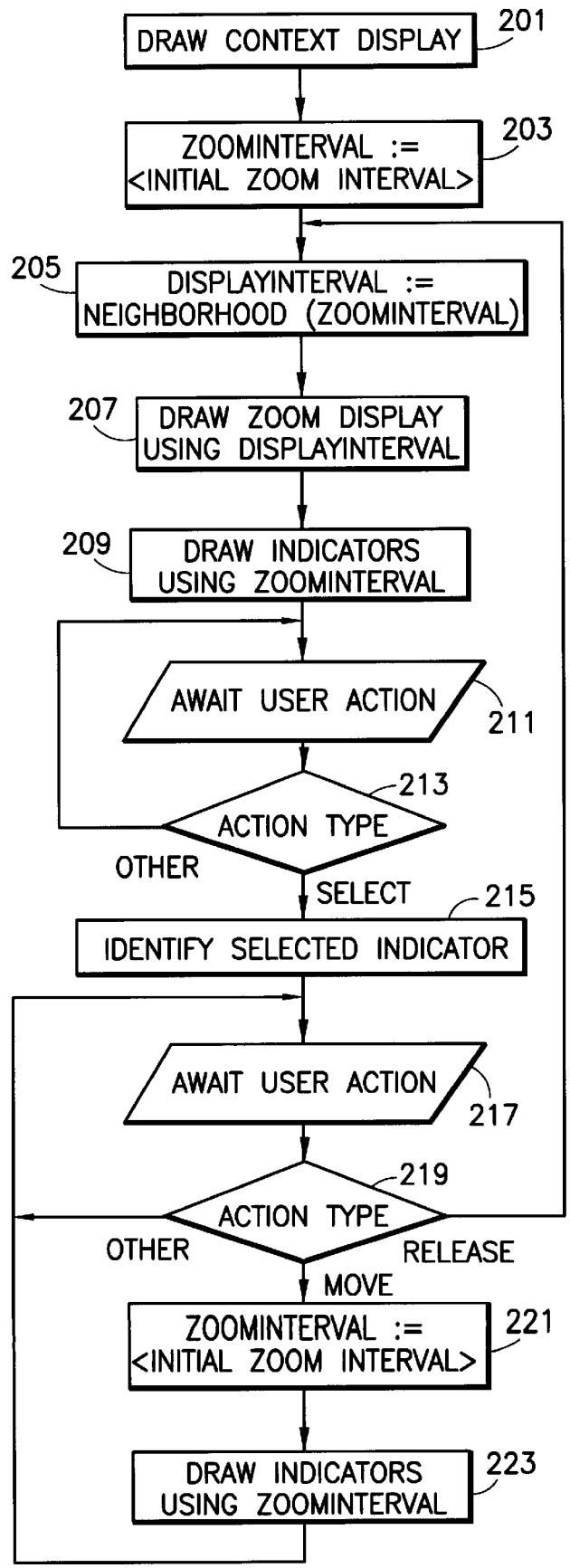
FIG. 9 is a flow chart illustrating the steps involved in drawing the graphical elements and in updating those elements in response to user actions according to the present invention.

FIG. 9 is a flow chart illustrating the context/zoom display control routine 121 of the application software of FIG. 1 that updates the context display CD and zoom display ZD in response to user actions, according to the present invention as illustrated in FIGS. 2–8. In step 201, the context/zoom display control routine 121 draws the context display CD. The commands utilized by the context/zoom display control routine 121 to draw and update the context display CD and the zoom display ZD depend upon the operating system 109 and the display management routine 117 running on the computer processing system 101. For example, if the operating system 109 is a Unix-based operating system and the display management routine 117 is X-windows, the commands utilized by the context/zoom display control routine 121 to draw and update the context display CD and the zoom display ZD may be found in "Xlib Programming Manual— Vols. 1 and 2", by Adrian Nye, O'Reilly and Assoc., 1990, herein incorporated by reference in its entirety. In another example, if the operating system 109 is IBM's OS/2, and the display management routine 117 is Presentation Manager, the commands utilized by the context/zoom display control routine 121 to draw and update the context display CD and the zoom display ZD may be found in "OS/2 2.0 Technical Library—Programming Guide", IBM, 1992, and "OS/2 2.0 Technical Library—Presentation Manager Programming Reference", IBM, 1992, both herein incorporated by reference in their entirety. Analogous commands may be utilized for Microsoft's Windows operating system, Apple's Macintosh operating system, and for other operating systems.

The context display CD preferably is a reduced representation of the entire one-dimensional data set in the display area of the graphical interface 105 used for the context display CD. In step 203, the zoom interval is initialized as a subinterval of the data set. The zoom interval is a data structure that holds a start point and an end point along the principle coordinate axis of the data set, and that determines the locations of the context and zoom indicators when they are drawn (see step 209). The initial zoom interval, for example, may be set to the entire data set, or some fixed subinterval (the middle third, the last tenth, etc.) of the data set.

In step 205, the display interval is set to some neighborhood of the zoom interval. The display interval is a data structure that holds a start point and an end point along the principle coordinate axis of the data set, and that determines the subinterval of the data set that is displayed in the zoom display (see step 207). The neighborhood of the zoom interval may be the zoom interval itself, in which case the zoom display will show the zoom interval without any context. On the other hand, the neighborhood may be somewhat larger than the zoom interval (10% larger, for example), in which case the zoom display will show some context for the zoom interval.

In step 207, the zoom display is drawn using the display interval. More specifically, the representation of the data set subinterval represented by display interval is drawn in the display area of the graphical interface 105 allocated for the zoom display. Depending on the size of the display interval, and therefore the scale of the zoom display, the representation of the data set subinterval in the zoom display may be reduced or abstracted in the same manner in which the representation of the entire data set is reduced in the context display.

In step 209, the context and zoom indicators are drawn at locations determined by the zoom interval. The indicators may be start, midpoint, and/or end indicators as discussed above with respect to FIGS. 2–8. For each indicator, the zoom interval determines the indicator's position along the principle coordinate axis of the data set. This position in turn determines the screen location in or adjacent to the context display (for a context indicator) or zoom display (for a zoom indicator) at which the indicator should be drawn. Any of a variety of visual artifacts (arrow heads, cursor lines, etc.) can be used as indicators. A line segment (or other artifact) connecting each zoom indicator with the corresponding context indicator may also be drawn but is not required.

In step 211, the context/zoom display control routine waits for input from the user. The form in which this input arrives depends on the graphical interface underlying the display. The user input may be a mouse click, key press, voice command, hand gesture or other user input. When input from the user arrives, in step 213 the type of input is determined. If the input is determined to be the selection of an indicator, operation continues to step 215, otherwise the input command will be processed and operation return back to step 211. Note that the input command may be relevant to, and should be handled by, some other part of the system, unrelated to the zooming mechanism described herein.

In step 215, the context/zoom display control routine determines which indicator the user has selected. The input may, for example, convey the information that the user pressed a particular button while the pointing device was pointing to some specific screen location. It is necessary to decide which of the various indicators the user intended to select. A variety of decision algorithms are possible. For example, the indicator that is geometrically closest to the pointing device location may be chosen as the selected indicator. Another option is to divide the area where the indicators are drawn into quadrants or sectors, one for each indicator, and the indicator associated with the sector that contains the pointing device location can be chosen as the selected indicator. Another alternative is to select that indicator whose graphical representation actually includes the pointing device location. Other similar decision algorithms may be implemented to select the appropriate indicator.

After the user has selected an indicator, in step 217 the context/zoom display control routine waits for further input from the user. When further input from the user arrives, in step 219 the type of input is determined. If the input is determined to be the movement of the selected indicator, operation continues to step 221 to update the zoom interval. In step 221, a new subinterval of the data set, based on the current value of the zoom interval and the movement of the selected indicator is determined, and the zoom interval is set to the new subinterval. The manner in which the zoom interval is modified depends on which indicator has been selected and moved. For example, if the selected indicator is a start indicator, only the start point in the zoom interval is modified. If the selected indicator is an end indicator, only the end point is modified. If the selected indicator is a midpoint indicator, both the start and end points of the zoom interval may be modified. In all cases, the magnitude of the modification(s) depends on the distance the selected indicator was moved and on whether the indicator is a context indicator or a zoom indicator. If the selected indicator is a context indicator, its motion is interpreted relative to the scale of the context display, which is determined by the overall extent of the data set along its principle coordinate axis. However, if the selected indicator is a zoom indicator, its motion is interpreted relative to the scale of the zoom display, which is determined by the current value of the display interval. In step 223, the context and zoom indicators are drawn at locations determined by the zoom interval in a manner similar to step 205. However, in this case, the zoom interval will have changed with respect to display interval, so some or all of the zoom indicators may be located outside the data set subinterval displayed in the zoom display. Preferably, those zoom indicators located outside the data set subinterval displayed in the zoom display are not drawn, but, if line segments connecting paired context and zoom indicators are shown, fragments of such line segments can be drawn to suggest the locations of off-display zoom indicators. After drawing the indicators in step 223, operation returns back to step 217 to await user action.

The description of FIG. 9 now returns back to step 219. If in step 219 the user input is determined to be the release of the selected indicator, operation returns back to step 205 wherein the zoom display and the indicators are redrawn to reflect any movement of the selected indicator that may have occurred. However, in step 219, if the user input is determined to be neither movement or release of the selected indicator, the user input command is processed and operation returns back to step 217 to await further user action. In this case, the user input command may be relevant to, and should be handled by, some other part of the system, unrelated to the zooming mechanism.

Figure 10A:
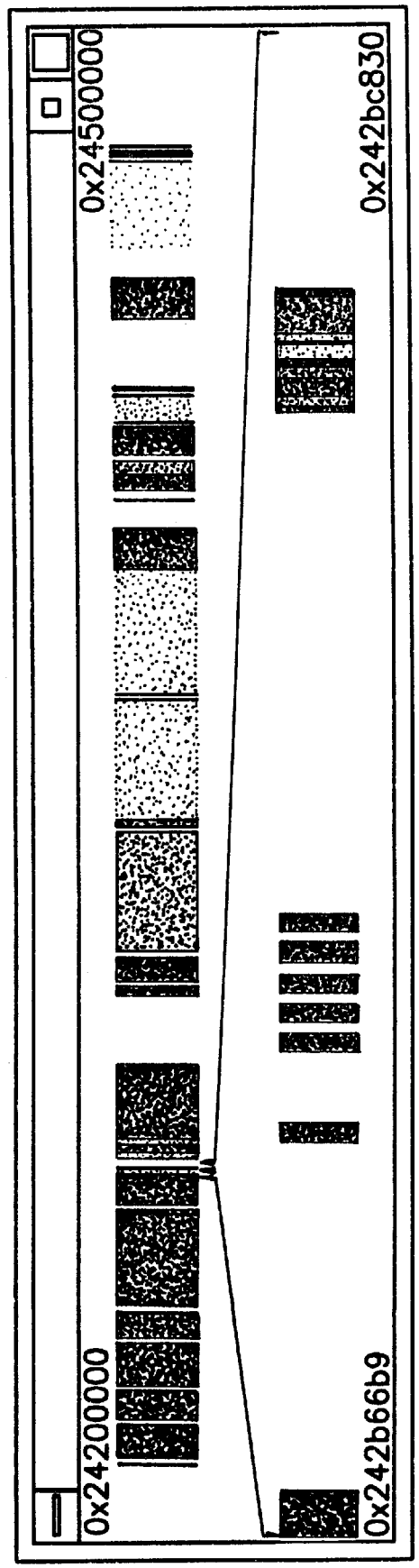
FIGS. 10(A) and (B) illustrate examples of embodiments of the zoom mechanism of the present invention.
Figure 10B:
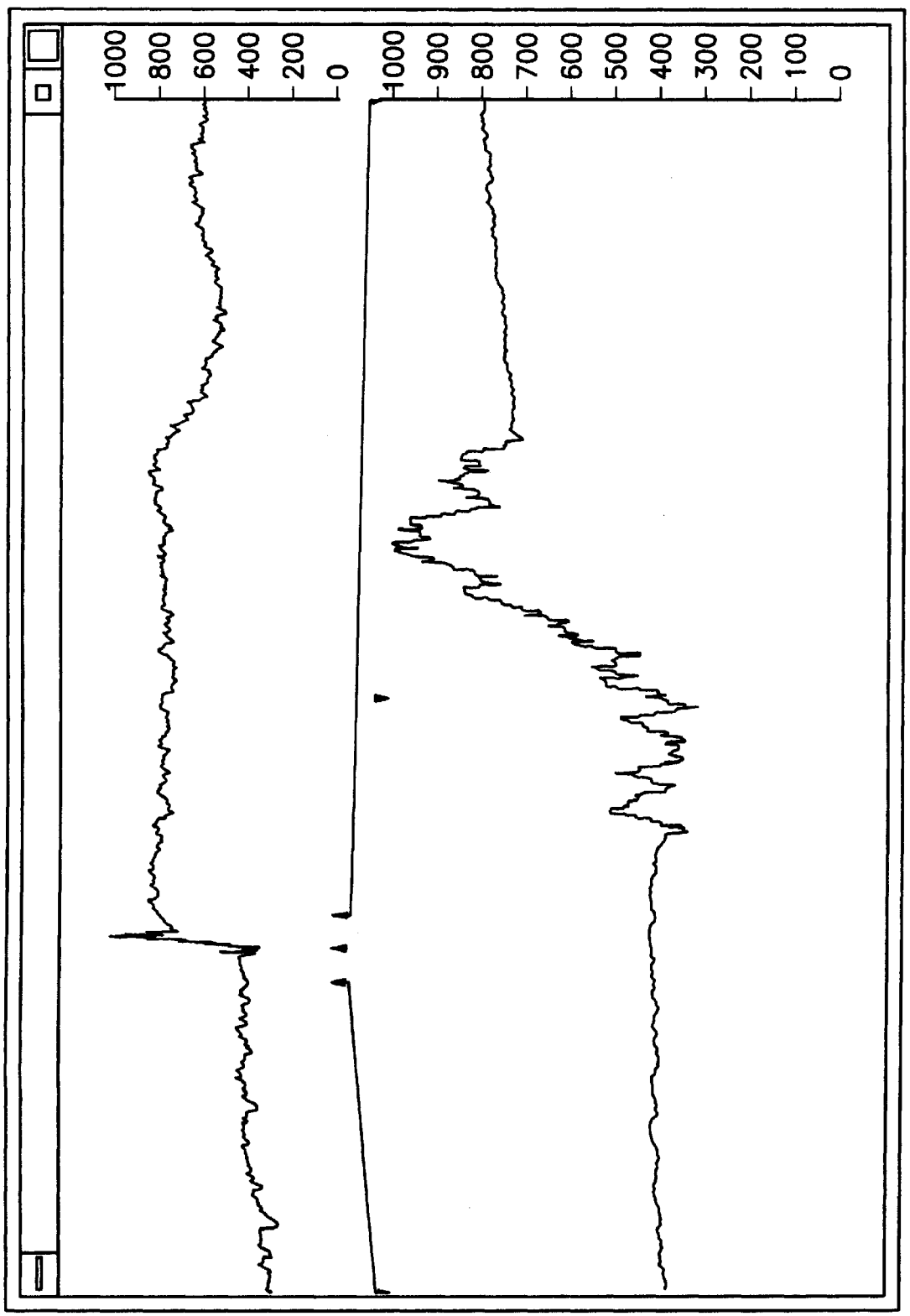

Advantageously, the zooming mechanism of the present invention provides for a uniform, intuitive, and user-friendly interface that allows both coarse-grained manipulation of the zoom interval in a context display and fine-grained refinement of the zoom interval in the zoom display. FIGS. 10(A) and (B) illustrates embodiments of the zoom mechanism of the present invention. In one example (FIG. 10(A)), the zoom mechnaism provides zoom control over a display that utilizes color (or greyscale) to indicate attributes of the address space of a computer program. In another example (FIG. 10(B)), the zoom mechanism provides zoom control over a display that uses a line graph to indicate vlaues of an arbitrary function whose values varies over time.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. A system for providing control over the selection of a zoom interval of a data set for display comprising:

a context display for displaying a representation of said data set;

a zoom display for displaying a representation of a zoom interval within said data set;

a context indicator that indicates one of a start point and end point of said zoom interval within said context display;

a zoom indicator, corresponding to said context indicator, that indicates said one of a start point and end point of said zoom interval within said zoom display; and zoom control means for updating said zoom interval according to user selection and movement of said context indicator and said zoom indicator to a new location within said context display and said zoom display, respectively.

2. The system of claim 1, wherein said data set is a one-dimensional data set.

3. A system for providing control over the selection of a zoom interval of a data set for display comprising:

a context display for displaying a representation of said data set;

a zoom display for displaying a representation of a zoom interval within said data set;

a start context indicator that indicates a start point of said zoom interval within said context display, and an end context indicator that indicates an end point of said zoom interval within said context display;

a start zoom indicator, corresponding to said start context indicator, that indicates said start point of said zoom interval within said zoom display, and an end zoom indicator, corresponding to said end context indicator, that indicates said end point of said zoom interval within said zoom display; and zoom control means for updating said zoom interval according to user selection and movement of said start and end context indicators and said start and end zoom indicators to a new location within said context display and said zoom display, respectively.

4. The system of claim 3, further comprising:

a midpoint context indicator indicating a midpoint of said zoom interval in said context display;

a midpoint zoom indicator, corresponding to said midpoint context indicator, indicating said midpoint of said zoom interval in said zoom display; and wherein said zoom control means updates said zoom interval according to user selection and movement of at least one of said midpoint context indicator and said midpoint zoom indicator to a new location within said context display and said zoom display, respectively.

5. A method of displaying a data set comprising the steps of:

displaying a representation of said data set in a context display;

displaying a representation of a zoom interval of said data set in a zoom display;

displaying a context indicator that indicates one of a start point and end point of said zoom interval within said context display;

displaying a zoom indicator, corresponding to said context indicator, that indicates said one of a start point and end point of said zoom interval within said zoom display; and updating said zoom interval according to user selection and movement of said context indicator and said zoom indicator to a new location within said context display and said zoom display, respectively.

6. The method of claim 5, wherein said data set is a one-dimensional data set.

7. A method of displaying of a data set comprising the steps of:

displaying a representation of said data set in a context display;

displaying a representation of a zoom interval of said data set in a zoom display;

displaying a start context indicator that indicates a start point of said zoom interval within said context display;

displaying an end context indicator that indicates an end point of said zoom interval within said context display;

displaying a start zoom indicator, corresponding to said start context indicator, that indicates said start point of said zoom interval within said zoom display;

displaying an end zoom indicator, corresponding to said end context indicator, that indicates said end point of said zoom interval within said zoom display; and updating said zoom interval according to user selection and movement of said start and end context indicators and said start and end zoom indicators to a new location within said context display and said zoom display, respectively.

8. The method of claim 7, further comprising the steps of:

displaying a midpoint context indicator indicating a midpoint of said zoom interval in said context display;

displaying a midpoint zoom indicator, corresponding to said midpoint context indicator, indicating said midpoint of said zoom interval in said zoom display; and updating said zoom interval according to user selection and movement of at least one of said midpoint context indicator and said midpoint zoom indicator to a new location within said context display and said zoom display, respectively.

* * * * *